June 17, 1930.  N. MORRIS  1,763,900
SOLDERING IRON
Filed June 16, 1927
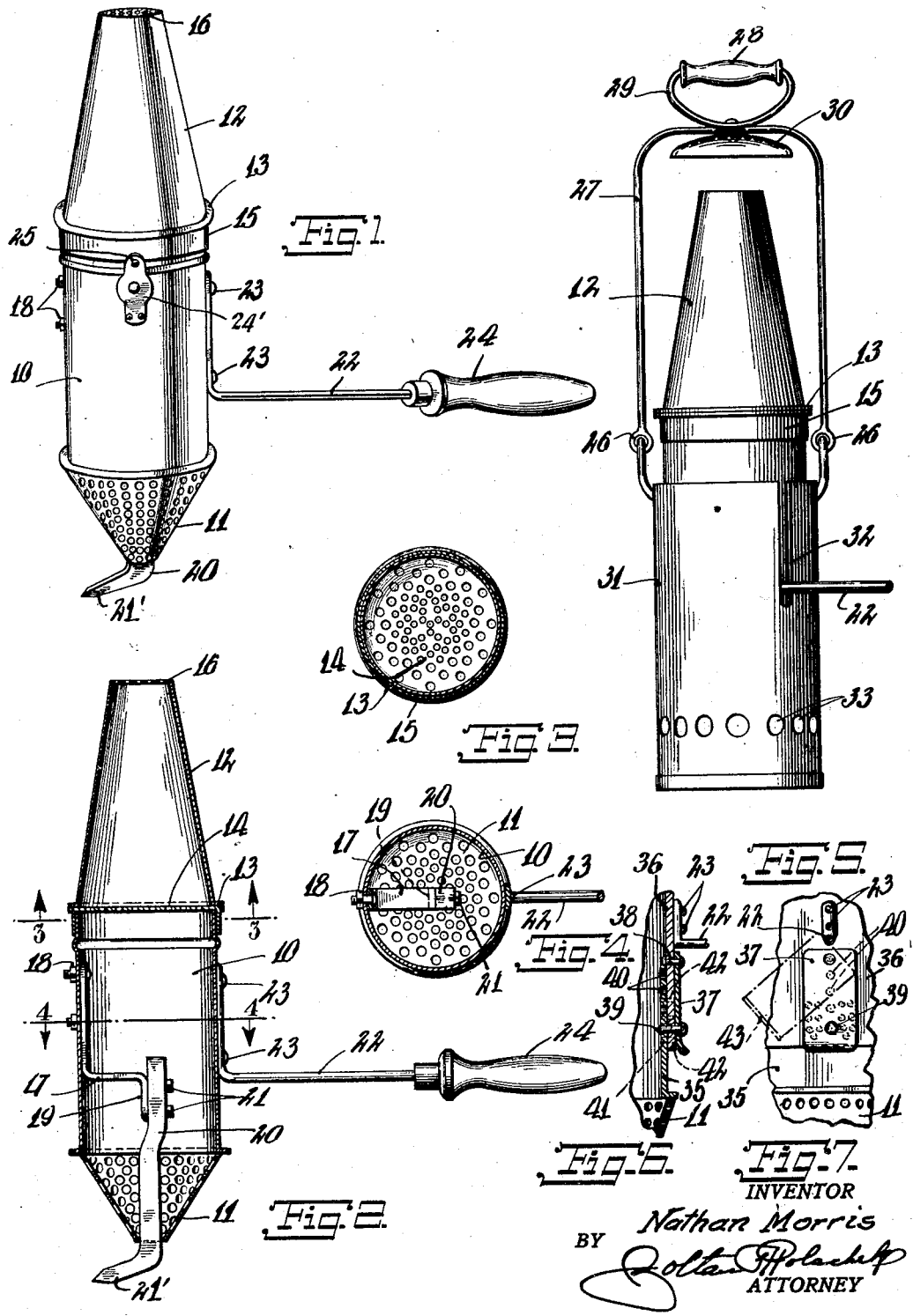
INVENTOR
*Nathan Morris*
BY
*Zoltan Holachek*
ATTORNEY Patented June 17, 1930

1,763,900

UNITED STATES PATENT OFFICE

NATHAN MORRIS, OF BROOKLYN, NEW YORK

SOLDERING IRON

Application filed June 16, 1927. Serial No. 199,197.

This invention relates to a new and useful device in the nature of a soldering iron, particularly adapted for use, whenever soldering is desired.

The object of the invention is to provide an improved soldering iron embodying a receptacle adapted to hold the heating medium, as a means of keeping the soldering iron continually hot, so as to expedite the work in hand.

A further object of the invention is to provide an improved soldering iron of novel construction and arrangement of parts hereinafter more fully described, claimed and illustrated in the accompanying drawing.

Fig. 1 is a perspective view of my improved soldering iron.

Fig. 2 is a central vertical sectional view thereof.

Fig. 3 is a transverse sectional view taken on the line 3—3 of Fig. 2.

Fig. 4 is a similar sectional view taken on the line 4—4 of Fig. 2.

Fig. 5 is a side elevational view thereof, illustrating same in place in the container or case, adapted for use when carrying my improved soldering iron.

Fig. 6 is an enlarged fragmentary sectional view illustrating a further development of my improved device.

Fig. 7 is a fragmentary side elevational view thereof.

As here embodied my improved device comprises a tubular member 10. The base member 11 of frusto-conical shape, is secured to the lower rim of the tubular member 10, and extends downwardly.

The cap 12 of frusto-conical shape, is provided with an outwardly extended lower flange, 13, to which the disc member 14 is secured. The rim or band 15 is secured to the edge of the disc member 14, and extends downwardly therefrom. The rim 15 is adapted to slidably engage the upper portion of the tubular member 10. The disc member 16 is secured to the upper extremity of the cap 12.

The above described construction is such as will permit the heating medium, coal, charcoal, or the like to be placed therein, the base member 11 and the disc members 14 and 16 being perforated to permit air to pass through the said heating medium to permit combustion when said heating medium is lighted.

The bracket 17 is attached, as at 18, by bolts, screws, or the like, to the tubular member 10, and is positioned inside thereof, and extends inwardly therefrom, and is provided with a downwardly formed portion 19, at or near the center of the tubular member 10. The soldering iron proper 20 is attached, at 21, by bolts, screws, or the like, to the portion 19 of the bracket 17 and extends downwardly therefrom through the open extremity of the base member 11. The soldering iron proper 20 is provided with a tip 21' angularly extended therefrom. The tip 21' is made of suitable material, such as is usually employed for soldering irons. The latter described construction is such as will permit the heating medium to impart or transfer the heat therefrom to the tip 21' of the soldering iron proper 20. The angularly extended tip 21' coacts with the inwardly extended portion of the bracket 17 for preventing complete displacement of the soldering iron 20 upon removal of the bolts 18 only. It is necessary that bolts 21 be removed for disconnecting the soldering iron from the bracket before the soldering iron can be removed from the conical member 11. This feature is of particular advantage in that should the soldering iron be in a heated condition so as not to be capable of being handled and should the user of the device loosen the bolts 18 with the intention of removing the soldering iron, the soldering iron and bracket cannot fall from the device. Handling of the soldering iron by the user will then call to his attention that it is too hot to be handled. After it has cooled sufficiently for handling the bolts 21 may be removed and this permits its complete removal. The rod 22 is attached, as at 23, by rivets, bolts, screws, or the like, to the tubular member 10, and extends horizontally therefrom, and is provided with a handle 24, as a means of holding my improved device, as may be desired when soldering.

The clips 24', are attached at or near the upper portion of the tubular member 10, and are extended somewhat outwardly therefrom, and have formed therein an aperture 25, adapted to receive the eyes 26 of the bail 27, which extends over the above mentioned cap 12. The handle 28 is attached to the handle bracket 29, which is secured to the upper central portion of the bail 27. The shield 30, formed or bent concave, is secured to the upper central portion of the bail 27. The above described construction is such as will permit my improved device to be lifted, or carried by the handle 28, the shield 30 preventing the hand of the person thus carrying my improved device from being burnt, when the heating element contained therein is burning.

The container 31 is of tubular construction, and is provided with an elongated opening 32, adapted to receive the rod 22, when my improved device is placed in the said container. The container is of suitable length to extend considerably below the said base member 11, and has formed therein, a plurality of apertures 33, as a means of permitting air for combustion purposes to freely enter my improved device. The above described construction is such as will permit the container 31 to hold my improved device in an upright position. It should be understood that the container 31 may be placed in a wet place, or in water, as the container 31 is of sufficient length, as above set forth, to prevent the said water from interfering with the burning of the heating medium contained therein.

In Figs. 6 and 7, I have shown the above mentioned tubular member, construction in two separate members, a lower tubular member 35, adapted to be slidably engaged by the upper tubular member 36. A pair of clips 37, are pivotally attached, as at 38, to the upper tubular member 36, and have attached thereto, at or near their free extremities a pin 39, extending inwardly therefrom, adapted to slidably engage in apertures 40, formed in the lower tubular member 36. The above described construction is such as will permit the said tubular members 35 and 36, to be held in any desired extended position, so as to increase the capacity of my improved device. Apertures 41 and 42 are formed in the said tubular members 35 and 36, adapted to register, or coincide so as to permit of visual inspection of the contents of my improved device, when the clips 37, are pivoted, or hinged, to one side, as designated by the reference numeral 43. The latter mentioned apertures 41 and 42 are comparatively smaller than the apertures 40, so as to prevent the pin 39, from being engaged in the wrong apertures.

It is to be understood that in my device, the soldering iron 20 may be readily removed for cleaning, or interchanged with different sizes of soldering irons, and by means of this construction it is possible to keep the tip 21' clean.

Having thus described my invention, what I claim as new and desire to protect by Letters Patent of the United States is as follows:

In a soldering iron of the class described, a fuel container comprising a tubular member connected with a bottom conical shaped member, a bracket located on the inner side of the tubular member, means for attaching the bracket on the tubular member, said bracket having an inwardly extended portion and a downwardly extended portion, and a soldering iron removably attached on the downwardly extended portion and extending thru the conical shaped member and formed with an angularly extended tip.

In testimony whereof I have affixed my signature.

NATHAN MORRIS.